US010691356B2

(12) United States Patent
Werner et al.

(10) Patent No.: US 10,691,356 B2
(45) Date of Patent: Jun. 23, 2020

(54) OPERATING A SECURE STORAGE DEVICE

(71) Applicant: INTERNATIONAL BUSINESS MACHINES CORPORATION, Armonk, NY (US)

(72) Inventors: Klaus Werner, Moetzingen (DE); Joerg Schmidbauer, Boeblingen (DE); Jakob C. Lang, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 16/199,402

(22) Filed: Nov. 26, 2018

(65) Prior Publication Data

US 2020/0167085 A1    May 28, 2020

(51) Int. Cl.
*G06F 3/06*   (2006.01)
*G06F 9/455*   (2018.01)
*H04L 29/06*   (2006.01)

(52) U.S. Cl.
CPC .......... *G06F 3/0622* (2013.01); *G06F 3/0631* (2013.01); *G06F 3/0673* (2013.01); *G06F 9/45558* (2013.01); *H04L 63/105* (2013.01); *G06F 2009/45587* (2013.01)

(58) Field of Classification Search
CPC .... G06F 3/0622; G06F 3/0631; G06F 3/0673; G06F 9/45558; H04L 63/105
See application file for complete search history.

(56) References Cited

U.S. PATENT DOCUMENTS

| 8,332,865 | B2 | 12/2012 | Schmidbauer et al. |
| 9,697,027 | B1 | 7/2017 | Hazra et al. |
| 9,734,325 | B1 | 8/2017 | Neumann et al. |
| 9,767,293 | B2 | 9/2017 | Boenisch et al. |
| 2014/0177842 | A1 | 6/2014 | Yellepeddy et al. |
| 2014/0282936 | A1 | 9/2014 | Fitzgerald et al. |
| 2016/0092687 | A1 | 3/2016 | Boenisch et al. |
| 2016/0105429 | A1* | 4/2016 | Boenisch ............ H04L 63/0853 713/171 |

(Continued)

OTHER PUBLICATIONS

Pending U.S. Appl. No. 15/876,502, filed Jan. 22, 2018, entitled: "Operating a Secure Storage Device With a Non-Volatile Memory".

(Continued)

*Primary Examiner* — Ryan Bertram
(74) *Attorney, Agent, or Firm* — Richard A. Wilhelm (57) ABSTRACT

A secure storage device is connected to a computer system. The secure storage device has a memory including a domain and a subdomain storing first and second data, respectively. The computer system includes a first level hypervisor managing a first level virtual machine, which supports a first operating system, and a second level hypervisor. The second level hypervisor manages a second level virtual machine, which supports a second level operating system. A first authentication process for the first level operating system uses first profile data sent by the computer system and a portion of the first data. A second authentication process for the second level operating system uses second profile data sent by the computer system and a portion of the second data. The first data is not accessible by the second level operating system. The second data is not accessible by the first level operating system.

20 Claims, 5 Drawing Sheets

(56) References Cited

U.S. PATENT DOCUMENTS

| | | |
|---|---|---|
| 2016/0147556 A1 | 5/2016 | Hu et al. |
| 2018/0020008 A1* | 1/2018 | Schoof .................. H04L 63/123 |
| 2018/0060574 A1 | 3/2018 | White et al. |
| 2019/0147192 A1* | 5/2019 | Khosravi ................ H04L 9/088 |
| | | 713/192 |
| 2019/0228163 A1* | 7/2019 | Lang ..................... G06F 3/0622 |

OTHER PUBLICATIONS

Arnold et al., "The Next Generation of Highly Reliable and Secure Encryption for the IBMz13", IBM J. Res & Dev. vol. 59, No. 4/5, Paper 6, Jul./Sep. 2015, pp. 1-13.

Wikipedia, "Transport Layer Security", https://en.wikipedia.org/wiki/Transport_Layer_Security, printed Dec. 29, 2017, pp. 1-17.

Gopalan et al., "Multi-Hypervisor Virtual Machines: Enabling an Ecosystem of Hypervisor-level Services", proceedings of the 2017 USENIX Annual Technical Conference (USENIX ATC '17), Jul. 12-14, 2017, pp. 1-17.

Carnahan, "Security Requirements for Cryptographic Modules", NIST, https://www.nist.gov/publications/security-requirements-cryptographic-modules, U.S. Department of Commerce / National Institute of Standards and Technology, Jan. 11, 1994, pp. 1-2.

Baldwin et al., "Encryption and Key management in a SAN", Proceedings of the First International IEEE Security in Storage Workshop (SISW'02), 2003 IEEE, pp. 1-10.

Bruni et al., "IBM z13 Configuration Setup", IBM.com/Redbooks, International Technical Support Organization, Chapter 10, "Crypto Express5S configuration", Apr. 2015, pp. 1-42.

* cited by examiner

OPERATING A SECURE STORAGE DEVICE

BACKGROUND

The present invention relates to the field of digital computer systems, and more specifically, to operating a secure storage device.

Distributed computer systems provide increasingly effective ways of providing numerous types of services. As the complexity and ubiquity of distributed computer systems increases, however, maintaining data security becomes more challenging. There is a constant struggle to address security vulnerabilities at least as fast as they are discovered. This struggle is exacerbated by the speed at which computer systems and their use evolve and the rate at which the stakes increase. At the same time, in many contexts, the security of data is of great importance. Many people, for example, trust companies with data that is intended to be kept private except in relatively few circumstances. Security breaches, consequently, can have harmful effects on an organization's operations, ranging from a loss of trust and goodwill to an inability to do business due to a system malfunction caused by a security breach. For that, secure storage devices such as, e.g., hardware security modules (HSMs) provide a secure data access service to customers via a computing resource provider that remotely hosts various computing resources that are remotely managed and operated by the customers.

BRIEF SUMMARY

Various embodiments provide a method for operating a secure storage device, computer system and computer program product as described by the subject matter of the independent claims. Advantageous embodiments are described in the dependent claims.

Embodiments of the present invention can be freely combined with each other if they are not mutually exclusive.

In one aspect, the invention relates to a method for operating a secure storage device comprising at least one memory area, the secure storage device being configured to connect to a computer system, the computer system comprising at least one first level hypervisor managing at least one first level virtual machine, VM, the first VM supporting a first operating system, OS, (or first level OS) and at least one second level hypervisor executed in the first level virtual machine, the second level hypervisor managing at least one second level virtual machine, the second VM supporting a second OS (or second level OS). The method comprises:
  assigning the memory area to the first OS;
  assigning a subarea of the memory area to the second OS;
  storing in the memory area first data indicative of the first OS; wherein the first data is not accessible by the second OS;
  storing in the subarea second data indicative of the second OS; wherein the second data is not accessible by the first OS;
  providing in the computer system first and second profile data indicative respectively of the first OS and the memory area and the second OS and the subarea;
  sending the first profile data to the secure storage device thereby causing the secure storage device to perform a predefined authentication process using the first profile data and a portion of the first data;
  sending the second profile data to the secure storage device thereby causing the secure storage device to perform the authentication process using the second profile data and a portion of the second data;
  in response to receiving by the first or second OS a request to manage the other portion of the first or second data respectively from a trusted key entry system forwarding by the first OS or the second OS the received request to the secure storage device thereby causing the secure storage device to process the request. Although the memory area for the second OS is a subarea of the memory area of the first OS, these memory areas are considered as independent areas where each OS can only access its own assigned area. The first OS is not allowed to access data stored in the subarea and the second OS is not allowed to access data in areas of the memory area that are different from the subarea assigned to the second OS. For example, the subarea is assigned to the second OS only and the memory area (excluding the subarea) is assigned to the first OS only.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for operating a secure storage device comprising at least one memory area, the computer system comprising at least one first level hypervisor managing at least one first level virtual machine, VM, the first VM supporting a first operating system, OS, and at least one second level hypervisor executed in the first level virtual machine, the second level hypervisor managing at least one second level virtual machine, the second VM supporting a second OS, the computer system further comprising first and second profile data indicative respectively of the first OS and the memory area and the second OS and the subarea. The system is configured for:
  assigning the memory area to the first OS;
  assigning a subarea of the memory area to the second OS;
  storing in the memory area first data indicative of the first OS; wherein the first data is not accessible by the second OS;
  storing in the subarea second data indicative of the second OS; wherein the second data is not accessible by the first OS;
  sending the first profile data to the secure storage device;
  sending the second profile data to the secure storage device;
  in response to receiving a request to manage the other portion of the first or second data respectively from the trusted key entry system forwarding by the first OS or the second OS the received request to the secure storage device thereby causing the secure storage device to process the request.

In another aspect, the invention relates to a method for operating a secure storage device comprising at least one memory area, the secure storage device being configured to connect to a computer system, the computer system comprising at least one first level hypervisor managing at least one first level virtual machine, VM, the first VM supporting a first operating system, OS, and at least one second level hypervisor executed in the first level virtual machine, the second level hypervisor managing at least one second level virtual machine, the second VM supporting a second OS. The method comprises:
  creating a partition in the computer system for providing a secure firmware appliance in the physical partition;
  configuring the second OS to connect to a remote trusted key entry system by connecting the trusted key entry system to the partition and connecting the partition to the second OS;
  configuring the second OS to receive data from the trusted key entry system via the firmware appliance and to send data to the secure storage device via the firmware appliance.

DETAILED DESCRIPTION

Embodiments of the present invention will now be described in detail with reference to the accompanying Figures. The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "Virtual Machine (VM)" or logical partition (LPAR) as used herein refers to a logical representation of a physical machine (computing device, processor, etc.) and its processing environment (operating system (OS), software resources, etc.) The VM is maintained as software that generally executes on an underlying host machine (physical processor or set of processors). From the perspective of a user or software resource, the VM appears to be its own independent physical machine. One or more VMs are created and managed by a hypervisor (also referred to as a virtual machine monitor or manager). A hypervisor enables communication between hardware and a VM. According to various embodiments, a first hypervisor may support a VM, which in turn supports a second hypervisor. To make clear which hypervisor is being referred to, a hypervisor that supports one or more VMs and which may execute on an underlying host machine is referred to as a first level hypervisor. A hypervisor running within the VM supported by the first level hypervisor is referred to as second level hypervisor. In various embodiments, the second level hypervisor may support a VM. To make clear which VM is being referred to, the terms first and second level VM are used. That is, a first level hypervisor may support a first level VM. The first level VM may support a second level hypervisor, which can support one or more second level VMs.

In various embodiments, a computer system may be configured to receive a request via network connection from a trusted key entry system and may determine based, for example, on the requested data in the request which operating system (OS) is assigned to a domain or subdomain of a secure storage device stores the determined data. For example, the determined OS may be a first level or second level OS and may be configured by the computer system to forward the request to the secure storage device. The network connection between a trusted key entry system and the computer system may be triggered by the trusted key entry system and may use TCP/IP protocol for data transfer. For example, together with the request, the trusted key entry system may send the information about the target secure storage device (e.g. HSM), the domain and/or subdomain. As each domain or subdomain is assigned to a respective OS (e.g. the first level OS or second level OS) this indicates which OS is concerned by the request and can thus forward the request.

The present method may provide a secured cryptographic configuration by binding the use of secrets in a virtualized environment to hardware. As used herein, cryptographic may be abbreviated as crypto. The present method may further secure access to the secure storage device compared to conventional methods. The present method enables an authentication process that is performed between the computer system and the secure storage device. Involving more than one component in the authentication process may further secure the access to the secret data.

The present method may make use of existing storage capacity of the secure storage device without requiring additional space for supporting second level OSs. This may be particularly be advantageous as the number of second level OSs per VM or LPAR is usually very high (e.g. 10000 second level OS per LPAR), thus adding domains for each additional second level OS may require a large storage space.

According to one embodiment, the method further comprises associating a portion of the first data with a first flag; associating a portion of the second data with a second flag; setting the first flag and second flag for enabling a change of the portions of the first and second data respectively. Using flags may enable further control access to data at the secure storage device, e.g., even if an application has right to access a subdomain or domain, the flag should be set in order to access the flagged associated data. This may enforce the secure aspect of the present method.

According to one embodiment, setting the first or second flag comprises receiving a request from the trusted key entry system for setting one of the first or second flags and forwarding the request to the secure storage device, thereby causing the secure storage device to set the first or second flag. The trusted key entry system manages the setting of the flags. This may enable a centralized approach where the trusted key entry system can manage more than one secure storage device.

According to one embodiment, the first and second flags may be a same or different flag. For example, a single flag may be used to access the portion of the first and second data, e.g., if the single flag is set the first and second data in the secure storage device may be accessed.

According to one embodiment, the portion of the first data comprises a first hash and the portion of the second data comprises a second hash, wherein the first profile data comprises a hash that is generated from a unique OS identification of the first OS and a configuration data indicative of the memory area, and the second profile data comprises a hash that is generated from a unique OS identification of the second OS and a configuration data indicative of the subarea, wherein the authentication process is configured to compare the received hash with respective stored first or second hash. The OS identification may comprise a unique identifier or a hash or a key of the OS. Comparing the hashes may provide a reliable and systematic method for authentication.

According to one embodiment, the second OS is configured to receive requests from the trusted key entry system via the first OS and to communicate with the secure storage device via the first OS. This may enable a seamless integration of the present method in existing systems as the second level OS operates through the first level OS.

According to one embodiment, the method further comprises creating a partition in the computer system for providing a secure firmware appliance in the partition, wherein configuring an authenticated second OS to connect to the remote trusted key entry system comprises connecting the trusted key entry system to the physical partition and connecting the physical partition to the second OS, and configuring the second OS to receive data from the trusted key entry system via the firmware appliance and to send data to the secure storage device via the firmware appliance. This embodiment may be advantageous as the first level OS may not be trusted and thus the communication path from the second OS to the secure storage device via the first OS may be not trusted. Using the partition which may be more secured than the first OS may enable a secure path for the second OS. The partition may, for example, be a logical or physical partition. For example, the partition may be a secure service container (SSC) FW partition.

According to one embodiment, the second profile data are sent via the firmware appliance. This may further increase the secure aspect of the present method by further securing the authentication process.

According to one embodiment, the received data at the second OS comprises a first set of keys, wherein the corresponding second set of keys is stored in the secure storage device, the method further comprising establishing a secure channel between the second OS and the secure storage device by exchanging the first and second set of keys. This may enable a secure communication channel between the OS and the secure storage device and may thus further increase the secure aspect of the present method.

According to one embodiment, the first set of keys comprising a private key of a first pair of keys and a public key of a second pair of keys, the second set of keys comprising a public key of the first pair of keys and a private key of the second pair of keys. This may enable a complex and secure distribution of the keys between the secure storage device and the computer system.

According to one embodiment, the sending of the second profile data is performed in case of a successful authentication of the first OS. This may particularly be advantageous in case the communication between the second OS and the secure storage device is performed through the first OS.

Figure 1:
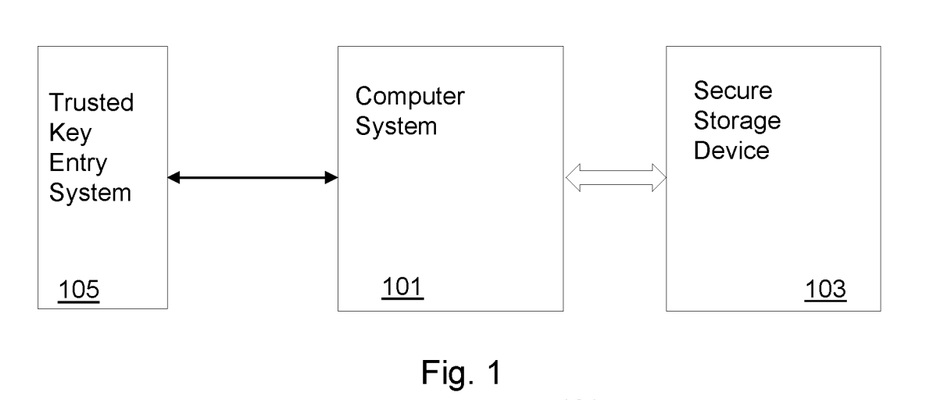
FIG. 1 depicts a diagram of a secure data management or processing system in accordance with an embodiment of the invention.

FIG. 1 depicts a diagram of a secure data management or processing system 100. The secure data management system 100 comprises a trusted key entry system 105, a computer system 101, and a secure storage device 103.

The trusted key entry system (TKE) 105 may be a separate from the computer system 101, as shown. In another embodiment, the trusted key system 105 may be part of the computer system 101, e.g., the computer system 101 may be configured to perform the function of the trusted key entry system 105. The TKE 105 is used to configure and manage secret data stored in the secure storage device 103.

The trusted key entry system 105 and the computer system 101 may be in communication with one another, e.g., they may be configured to connect to each other directly or via a network. The network may, for example, be a TCP/IP network that enables communication using a TCP/IP communication protocol. The TKE system 105 may be configured to act in a client server configuration with the computer system 101 being configured as a server and the TKE system as a client. The connection of the TKE system 105 and the computer system 101 may, for example, indicate the host name, local domain name, and name server addresses.

The secure storage device 103 and the computer system 101 may be in communication with one another, e.g., secure storage device 103 may be configured to connect or attach to the computer system 101 via, for example, a PCI or PCIe interface. In various embodiments, the secure storage device 103 may be a card configured to be inserted in a PCIe slot of the computer system 101. The secure storage device 103 may be a hardware security module (HSM), which may be realized as a crypto card (a hardware device for accelerating cryptographic operations). The secure storage device 103 may be configured with secure, tamper-resistant packaging technology to deter sophisticated attackers from being able to break into the device to extract keys and other secret data, or otherwise modify the function of the device. The secure storage device 103 may, for example, be an integrated set of security components that may be used individually or together to provide cryptographic functions and application programming interfaces (APIs) that provide functions that may be needed by the computer system 101. For example, cryptographic functions that may be used by the computer system 101 may be implemented in the secure storage device 103, such that the computer system 101 may perform other operations by its available CPU. In addition, the implementation in the secure storage device is a secured implementation.

The secure storage device 103 may be configured so that all of its stored cryptographic keys may be securely protected from disclosure, modification, and misuse. The secure storage device 103 may also be configured to guarantee that there can be no tampering with the operation of the security functions executed by the secure storage device 103.

The computer system 101 may comprise a service component (e.g. which is part of an OS) that provides cryptographic services using the secure storage device 103. For example, the service component may be the Integrated Cryptographic Service Facility (ICSF) that uses the secure storage device 103 to perform hardware crypto functions. The service component may provide an application programmers interface (API) for applications that need to perform crypto functions and need to access data of the secure storage device 103.

The service component may, for example, provide multiple services or utilities. Each of the utilities may be associated with an access control point. A given access control point may have values indicating the type of usage of the corresponding utility. For example, it may indicate whether utility is enabled by default or disabled, etc. To execute a given service or utility on the secure storage device 103, a corresponding access control point may be enabled for the given service in the service component. The TKE system 105 may be configured to allow the computer system 101 to enable or disable access control points.

The computer system 101 may, for example, use a System Authorization Facility (SAF) such as z/OS Security Server RACF to control which applications can use specific keys, utilities and services that are provided by the service component. This may ensure that keys and services are used only by authorized users and jobs.

Figure 2:
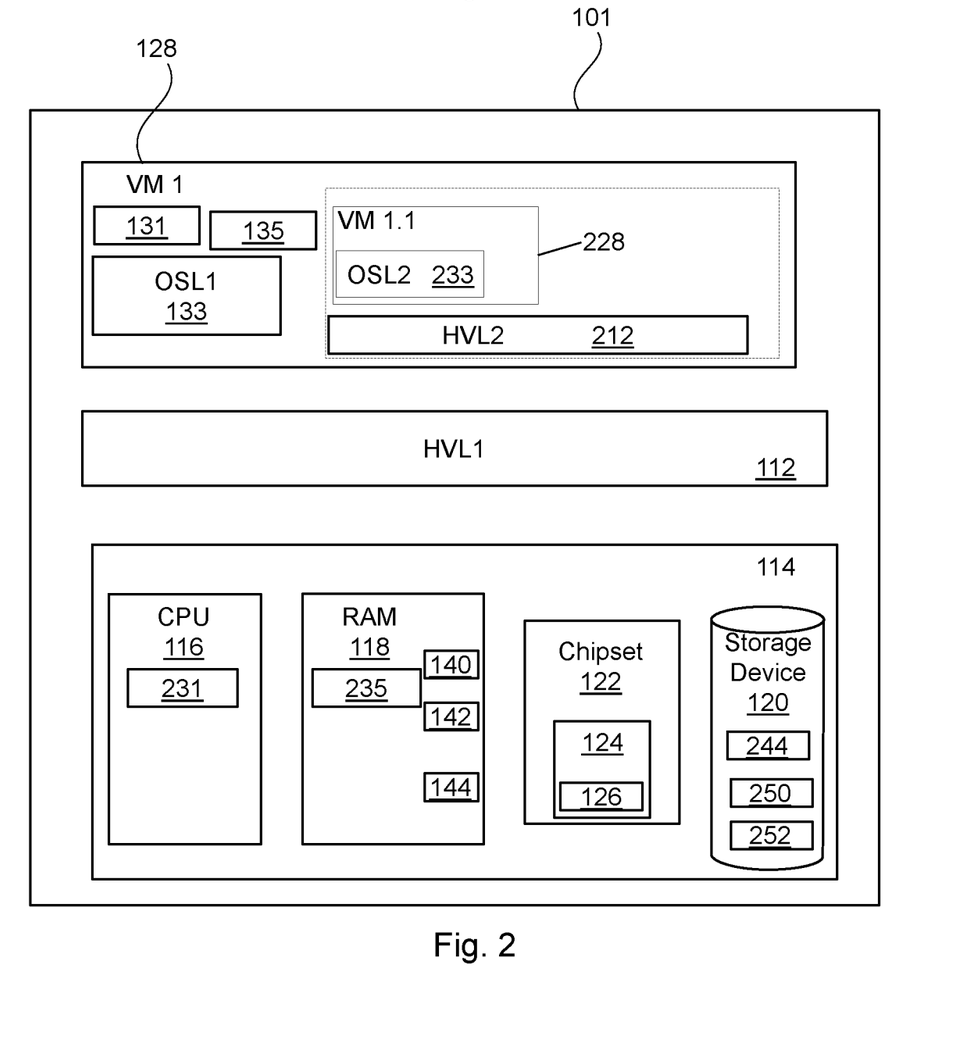
FIG. 2 depicts a block diagram of the computer system of FIG. 1 in accordance with an embodiment of the invention.

FIG. 2 depicts a block diagram of the computer system 101. The computer system 101 may include or be managed by a hypervisor 112. The hypervisor 112 may create and manage one VM, or a plurality of virtual machines 128.1-128.N. The hypervisor 112 may enable its virtual machines 128.1-128N to share physical resources 114 of the computer system 101. Physical resources 114 may perform processing of data or instructions, and may comprise one or more processors 116 that execute instructions, memory, e.g., random access memory (RAM) 118 that stores information for processing, a storage device 120, such as a hard disk drive (HDD), electromechanical hard drive, and solid state hard drive, and a chipset 122 that includes firmware 124 to coordinate interactions between physical processing resources. One example of firmware 124 is a basic input/output system (BIOS) 126 that boots hypervisor 112 from an off state in storage of hard disk drive 120 to an on state in RAM 118 for execution by processor 116. The hypervisor 112 may, for example, be a layer of firmware that supports virtualization technologies, logical partitioning (LPAR), and dynamic resource movement across multiple operating system environments. In an operational state, hypervisor 112 executes using physical resources 114 to support operations of virtual machines (or LPARs). A number of programs may be stored in storage device 120, and/or RAM 118, and executed by processor 116 including an operating system and/or application programs.

Components of the physical resources 114 may be interconnected by one or more system busses which couples various system components to processor 116. The system buses may be any of several types of bus structures including a memory bus or memory controller, a peripheral bus, and a local bus using any of a variety of bus architectures.

The hypervisor 112 may be referred to as a first level hypervisor (HVL1). The first level hypervisor 112 may be configured to create and manage at least one virtual machine, VM 128 (or logical partition LPAR). The VM 128 may be referred to as a first level VM. The first level VM 128 may support an operating system, OSL1, 133 (or Guest 1 OS), which may be referred to as a first level OS. Only one first level VM is shown for clarity, however, the hypervisor 112 is not limited to creating and managing a single first level VM. Additional first level VMs may be managed by the first level hypervisor 112, and what is described herein with regard to VM 112 may apply for the other first level VMs.

The first level VM 128 may further support at least one hypervisor HVL2, 212 that is executed in the VM 128. A hypervisor supported by a first level VM is referred to as a second level hypervisor. The second level hypervisor 212 may be configured to manage at least one second level VM 228. The VM 228 supports a second level operating system OSL2 233 (or guest 2 OS).

The first level VM 128 further comprises or supports at least one virtual CPU 131, a virtual system memory or VM memory 135, one or more applications running on the first level operating system OSL1 133 and optionally at least one virtual disk. The components of the first level VM 128 may be implemented in software to emulate the corresponding components of a physical computer. For example, the first level VM 128 comprises a virtual system memory 135 which may be implemented in software emulating the corresponding physical memory 235 of the RAM 118. The virtual CPU 131 of the first level VM 128 is emulating the corresponding physical CPU 231 of the processor 116. The virtual disk 133 of the virtual machine 128 is emulating the corresponding physical disk 244 of the storage device 120.

The storage device 120 and/or RAM 118 may, for example, store profile data that is indicative or descriptive of the first level operating system OSL1, 133 and second level operating system OSL2, 233. For example, the storage device 120 may store first profile data 250 indicative of the first level operating system OSL1, 133. The first profile data 250 may further indicate which memory area or domain of the secure storage device (SSD) 103 is assigned to the first level operating system OSL1, 133. (Domains and subdomains of the secure storage device 103 are described below.) The first profile data 250 may comprise a unique identifier of the first level operating system OSL1, 133 and specific cryptographic configuration data related to the domain of SSD 103 assigned to the OSL1, 133. For example, the cryptographic configuration data may comprise a mapping between the unique identifier of OSL1, 133 and an indication of the one or more domains of SSD 103 that are assigned to the OSL1, 133.

The storage device 120 may further store second profile data 252 indicative of the second level operating system OSL2, 233. The second profile data 252 may indicate which memory subarea or subdomain of SSD 103 (cf. FIG. 3) is assigned to the second level operating system OSL2, 233. The second profile data 250 may comprise a unique identifier of the OSL2, 233 and specific cryptographic configuration data related to the subdomain of SSD 103 assigned to the OSL2, 233. For example, the cryptographic configuration data may comprise a mapping between the unique identifier of second level operating system OSL2, 233 and an indication of the one or more subdomains of SSD 103 that are assigned to the OSL2, 233.

In one example, a Hardware Management Console (HMC) desktop may be used for defining and/or setting up an image activation profile. For example, an image activation profile is used to define a logical partition, where a L1 OS can be loaded, e.g., a z/VM. The HMC may communicate to the computer system 101 through a service processor of the computer system 101. The HMC may, for example, be connected via Ethernet to the computer system 101. The service processor may be an embedded controller that monitors and controls the hypervisor 112 and 212 and may be running the bare metal Linux.

Figure 3:
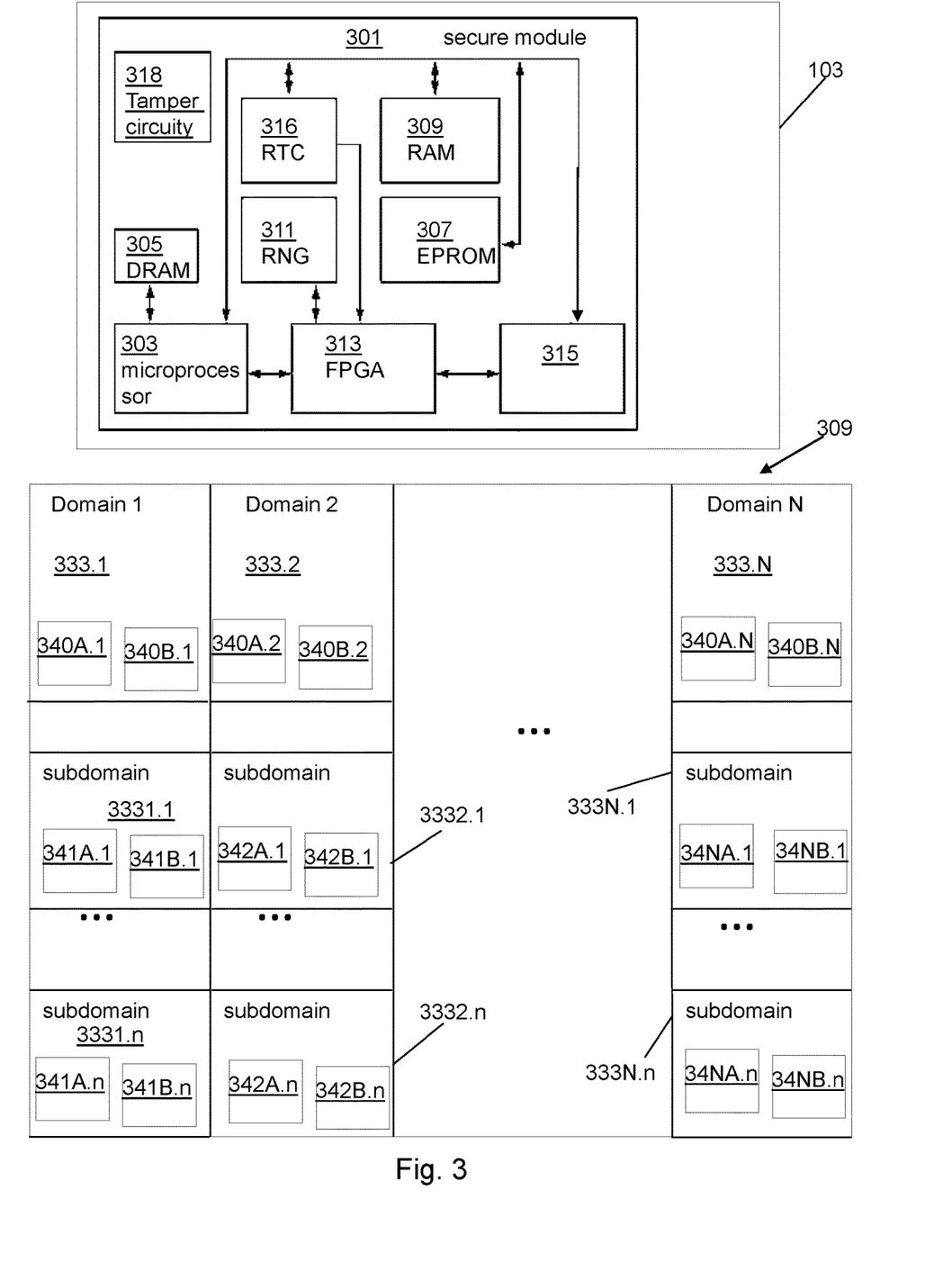
FIG. 3 depicts an example structure of the secure storage device in accordance with an embodiment of the invention.

FIG. 3 depicts an example structure of the secure storage device 103 in accordance with the present disclosure. The secure storage device or card 103 may, for example, be implemented in the form of a PCIe adapter card, i.e., a crypto card. As mentioned, the secure storage device 103 may be a hardware security module (HSM). The secure storage device 103 may include a cryptographic coprocessor, such as the 4768 PCIe cryptographic coprocessor. Other types or examples of cryptographic coprocessors may be used and configured with the present disclosure such that the RAM of such coprocessors has the structure as described herein. The secure storage device 103 comprises a secure module 301 containing security-related components and a base card that interfaces with the computer system 101. The secure module 301 may be designed to meet the security requirements of the FIPS 140-2 standard. In one embodiment, the internal components of the secure module 301 comprise a processor subsystem consisting of a microprocessor 303, with a dynamic random-access memory (e.g. SDRAM) 305, a flash-erasable programmable read-only memory (flash EPROM) 307 for persistent data storage, and a static RAM 309 backed up with battery power when the secure storage device 103 is powered off. The microprocessor 303 serves as the primary controller of operations of the secure storage device. The microprocessor 303 may, for example, orchestrate operation of the hardware in the card and implement communications with the computer system 101 and the cryptographic API functions that comprise the external interface from host application programs to the card.

The secure module 301 may be designed with tamper-detection circuitry or tamper controller 318 which is configured for deterring or preventing physical intrusions.

The secure module 301 may further optionally comprise a hardware-based cryptographic-quality random number source 311. The secure module 301 may further comprise a field-programmable gate array (FPGA) 313. The FPGA 313 may be configured to support high-performance communications to the card 103 and between the microprocessor and cryptographic engines (e.g. 315) inside the card.

The secure module 301 may be designed with extensive integrated error checking to ensure that no hardware failures result in undetected errors in customer data. The cryptographic-quality number source 311 includes hardware redundancy in all cryptographic algorithms so that any errors will be detected and will prevent erroneous results. In addition, a real-time clock (RTC) module 316 maintains the date and time for use by the microprocessor 303.

The secure module 301 may further comprise a chip 315 that provides hardware implementation of cryptographic functions performed by the card. An internal PCI bus is used to interconnect the microprocessor 303 and other hardware devices on the card.

The secure module 301 may store software that runs on the microprocessor 303. For example, the secure module 301 may store an application program that runs on the microprocessor 303 to give the card the cryptographic API functions seen by programs of the computer system 101. The application program may be configured to perform an authentication process in accordance with the present disclosure.

A memory of the secure module 301, e.g., the static RAM 309, may comprise one or more memory areas 333.1-N, which may be referred to as domains (domain 1, domain 2 . . . domain N). In an embodiment, the memory of the secure module 301 may be a persistent memory. Each of the domains 333.1-N may be attributed or assigned to a first level operating system. For example, domain 1 (333.1) may be attributed or assigned to a first level operating system OSL1, 133 (shown in FIG. 2).

Secret data may be stored in the domains 333.1-N. The secret data may comprise two or more portions. For example, the domains may store first portions of data 340A.1-340A.N that may be used by the authentication process in accordance with the present disclosure, and second portions of data 340B.1-340B.N that, for example, comprises master keys.

Each of the domains 333.1-N may include one or more subdomains or subareas 3331-333N. In FIG. 3, subdomains are shown below the respective domain. For example, domain 1, 333.1 may comprise subdomains 3331.1 to 3331.*n*, and domain 2, 333.2 may comprise subdomains 3332.1 to 3332.*n*. The subdomains may be used to store additional secret data. The number of subdomains per domain may be independent of the number of domains. The subdomains 3331-333N may be attributed or assigned to second level operating systems. For example, subdomain 3331.1 of domain 1 may be attributed or assigned to second level OSL2, 233 (shown in FIG. 2). The subdomain 3331.*n* of domain 1 may be attributed or assigned to another second level operating system.

An alternative to providing subdomains 3331-333N within the domains 333.1-N is to configure the memory of the secure module 301 without subdomains. In this alternative, the secure module 301 would only include domains, but in a quantity of domains larger than is required according to embodiments of the invention. In this alternative, domains would be tied to first level guests, and an additional TKE configuration step would be required to provide for second level guests. The extra step is required because the system is not able to predict whether a particular SSD 103 domain is to be used by a first or second level guest. In addition to a need to include an additional TKE configuration step, additional memory would be required in the computer system because data used for the infrastructure is stored in the computer system on a domain basis, and providing a particular quantity of domains without subdomains would require more memory than providing a smaller number of domains having subdomains. Accordingly, embodiments of the present invention may provide for a smaller number of configuration steps and require less memory capacity than would otherwise be required.

The subdomains 3331-333N may store data that is indicative of a respective second level OS to which the subdomain is assigned. The data stored in the subdomains may be secret data and may comprise two or more portions. For example, the data stored in a subdomain 3331.1 may comprise a first portion of secret data 341A.1 that can be used to perform authentication in accordance with the present disclosure, and second portion of the secret data 341B.1 that stores, for example, master keys. For example, the first portion of secret data 341A.1 may be used by the secure storage device 103 to perform authentication or secure binding for the second level operating system OSL2, 233 before enabling the OSL2 to access the second portion of secret data 341B.1 storing master keys.

A flag (not shown) may be associated with each of the instances of secret data stored in first portions 340A.1-340A.N of the domains and each of the instances of secret data stored in first portions 341A.1-*n*, 342A.1-*n* . . . 34NA.1-*n* of the subdomains. A flag may be set such that it indicates whether the respective secret data can or cannot be accessed. The flags may, for example, be set by an authenticated administrative user via the TKE system 105. In another example, the secret data stored in first portions of the domains 340A.1-340A.N and in first portions of the subdomains, e.g., 341A.1-*n*, 342A.1-*n* . . . 34NA.1-*n* may all be associated with a single flag which may be set to indicate whether the secret data stored in first portions 340A.1-340A.N and in first portions 341A.1-*n*, 342A.1-*n* . . . 34NA.1-*n* can or cannot be accessed.

Referring to FIG. 3, in one example, the domain 333.1 may be assigned to the first level operating system OSL1, 133 and the subdomain 3331.*n* may be assigned to the second level operating system OSL2, 233. However, even though the subdomain 3331.*n* is part of the domain 333.1, which is assigned to first level operating system OSL1 133, the first level operating system OSL1 133 is not allowed to access the data stored in the subdomain 3331.*n*. Only second level operating system OSL2 is allowed to access data stored in subdomain 3331.*n*. If, for example, another second level VM of the first level VM 128, is provided in FIG. 2, wherein the other second level VM supports another second level operating system OSx, which will be referred to as a third OSx. This third OSx may be a second level operating system and configured similarly as the second level operating system OSL2, 233. The third OSx may be assigned a subdomain such as 3331.2 (not shown). In this example, only the third OSx has permission to access the data of subdomain 3331.2, while first level operating system OSL1, 133 and the second level operating system OSL2, 233 will not have permission to access the subdomain 3331.2

Each of the first portions of secret data 340A.1-340A.N of the domains and each of the first portions of secret data 341A.1-n, 342A.1-n . . . 34NA.1-n of the subdomains may comprise a hash value or fingerprint that uniquely identifies the OS that is assigned to that domain or subdomain. For example, the first portion of secret data 340A.n may comprise a hash value or fingerprint that uniquely identifies a second level operating system that is assigned to the subdomain 3331.n which stores said portion 340A.n. The hash value may be generated by a predefined hash function using data indicative of the OS, such as the data stored in the profile data 250 and 252.

Figure 4:
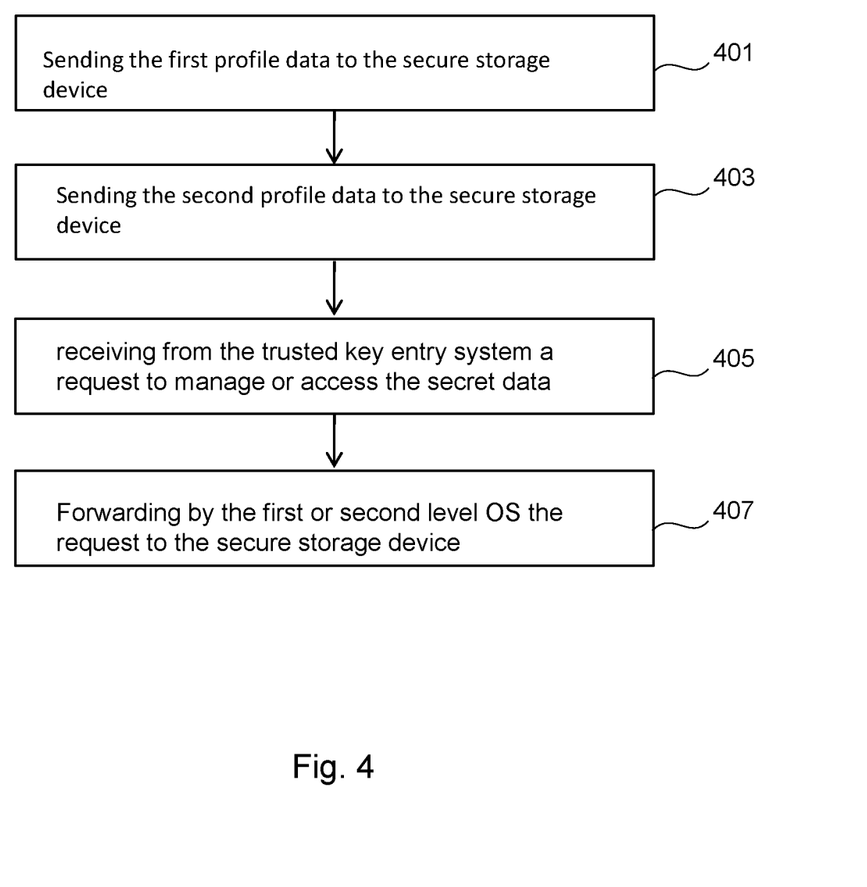
FIG. 4 is a flowchart of a method for operating a secure storage device in accordance with an embodiment of the invention.

FIG. 4 is a flowchart of a method for operating a secure storage device 103. In step 401, the first profile data 250 may be sent from the computer system 101 to the secure storage device 103. This may cause the secure storage device 103 to, upon receiving the first profile data 250, perform a predefined authentication process using the first profile data and the first portion of secret data 340A.1 stored in domain 1, 333.1, and which corresponds to the first level OSL1, 130. The secure storage device 103 performs an authentication process using the first profile data because the first profile data 250 describes the OSL1, 130. The first portion 340A.1 is used for the authentication because it is stored in the domain 333.1 which is the domain assigned to OSL1, 130, as exemplified above.

The authentication may, for example, comprise the generation of a hash using the first profile data using the same predefined hash function and a comparison of the generated hash with the hash stored in first portion 340A.1.

The authentication may be successful if, for example, the compared hashes are the same, otherwise the authentication fails, e.g., because the data used to generate the hash stored in the secure storage device 103 may have changed over time resulting in the current data namely the first profile data 250.

Step 401 may enable an authentication of the first level OSL1, 130 which further secures the access to the secure storage device 103. This may add additional checks and constraints as the OSL1, 130 may have been authenticated in another stage, e.g., at the SAF of computer system 101.

In step 403, the second profile data 252 may be sent to the secure storage device 103. This may cause the secure storage device 103 to, upon receiving the second profile data 252 perform an authentication process using the second profile data 252 and the first portion of the secret data 341A.n, which corresponds to the second level OSL2, 233 because the second profile data 252 describes the OSL2 233. The first portion 341A.n is used for the authentication because it is stored in the subdomain 3331.n, which is the subdomain assigned to OSL2 233 as exemplified above.

In one embodiment, step 403 may only be executed after a successful authentication of step 401. In another embodiment, step 403 may be executed regardless of the authentication result of step 401.

Step 403 may enable an authentication of the second level OSL2, 233 which further secures the access to the secure storage device 103. This may add additional checks and constraints as the OSL2, 233 may have been authenticated in another stage, e.g., at the SAF of computer system 101.

If successfully authenticated, the first level OSL1, 130 may be enabled to act on behalf of the TKE system 105 in order to forward requests to access the second portions of secret data of the domains 340B.1-340B.N. Similarly, if successfully authenticated, the second level OSL2, 233 may be enabled to act on behalf of the TKE system 105 in order to forward requests to access the second portions of secret data of the subdomains 341B.1-n, 342B.1-n . . . 34NB.1-n.

As one example, in step 405, the computer system 101 receives a request from the trusted key entry system 105. The request is a request to manage or access the second portion of the secret data 340B.1, which is stored in a domain that is assigned to first level OSL1, 130. In step 407, in response to receiving the request, the OSL1, 130 may forward the received request to the secure storage device 103. This may cause the secure storage device 103 to process the request upon receiving it.

In another example, and in response to receiving by the computer system 101 a request to manage or access a second portion of the secret data, which is stored in a subdomain that is assigned to second level OSL2, 233, the OSL2 may forward the received request to the secure storage device 103. This may cause the secure storage device to process the request upon receiving it. The request may be received from the TKE system 105.

The requests may be received via an established network connection between the TKE system 105 and the computer system 101. The network connection may use the TCP/IP communication protocol for data transfer. Depending on the type of data indicated in the request, e.g. subdomain number, the respective domain or subdomain where it is stored may be determined by the computer system 101 and the operating system that is assigned to that determined domain or subdomain may perform the forwarding of the request.

In case multiple second level OSs being managed by the second level hypervisor 212, each of the second level operating systems are assigned a respective subdomain of the same domain or of different domains. Step 403 may be executed for each of the second level OSs such that each authenticated second level OS may be configured to forward a request received from the TKE system 105 to access data stored in a subdomain that is assigned to the respective second level OS.

Figure 5:
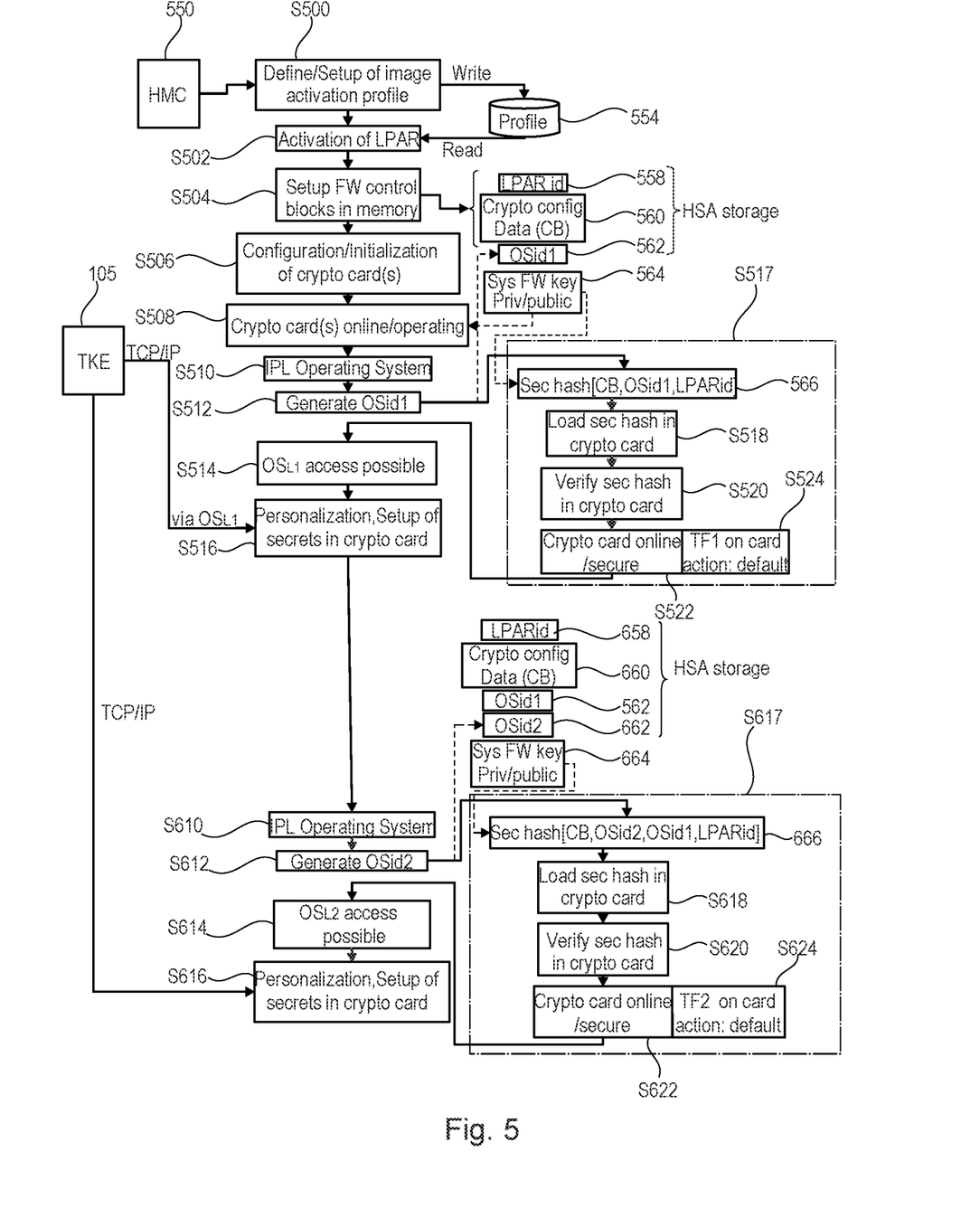
FIG. 5 depicts a flow chart of a process for initialization of the computer system and the secure storage device in accordance with an embodiment of the invention.

FIG. 5 depicts a flow chart of a process for initialization of the computer system 101 and the secure storage device 103 according to an example of the present disclosure.

The process starts with defining and/or setting up an image activation profile in step S500, where a number of logical partitions or virtual machines such as VM 128 and/or a number of processors are defined. Input to this step may be delivered by the hardware management console (HMC) 550. The profile 554 is written to a storage, such as storage device 120, from which it may be read when activating a logical partition in step S502. Next in step S504 firmware control blocks are set up in a storage of the secure storage device 103 for defining memory accesses, comprising an identity of the logical partition 558 as well as cryptographic configuration data 560. Then at least one crypto card or secure storage device 103 is configured and/or initialized in step S506 in a secure boot process, followed by step S508, where the secure storage device 103 is operating. In step S510, an initial program load of an operating system OSL1 is performed, followed by generating an identity or identifier (OSid1) 562 of the OSL1 in step S512. The OSid1 562 is stored in the secure storage device 103 as well, e.g., in a domain of the secure storage device 103.

Then the secure binding process S517 is started by generating a secure hash 566. The secure binding process is started using a system firmware key 564 contained in a certificate, which may be either private or public. In one embodiment, the secure hash 566 may include the OSid1 562. In another embodiment, the secure hash 566 may include an OSid1 562 and (a) an identity of the logical partition (VM) 558 or (b) a cryptographic configuration data 560, or both (a) and (b). The secure hash 566 is loaded by the OSL1 into the secure storage device 103 in step S518, followed by a verifying process (or authentication process) in the secure storage device 103 in step S520. Then the secure storage device 103 is set to online in a secure mode in step S522 for accesses by or involving the first level OSL1. A first trusted key entry flag TF1 is set to an on-state in step S524, resulting in setting a crypto card action to default action. If the trusted key entry flag TF1 is in an on-state, no changes via the OSL1 to the system are allowed, if the trusted key entry flag TF1 is in an off-state, changes via the OSL1 to the system are allowed. A customer, e.g. an owner of the OSL1 and associated data in the secure storage device, thus may authorize a provider via the trusted key entry flag TF1 to perform changes to the system. Authorization is enabled via the trusted key entry (TKE) system 105.

Having accomplished the secure binding process S517, access to the first level operating system OSL1 130 is possible, step S514. By action of a customer via the TKE system 105, which may be a terminal or, e.g., a Linux workstation, transmitted possibly over TCP/IP via the operating system OSL1 130, a personalization and a setup of secret data stored in domains assigned to OSL1 130 in the secure storage device 103 can be performed.

In step S610 an initial program load of second level operating system OSL2 is performed, followed by generating an identity or identifier (OSid2) of the second level OSL2 in step S612. The OSid2 is stored in the secure storage device 103 as well, e.g., in a subdomain of the secure storage device 103.

Then the secure binding process S617 is started by generating a secure hash 666. The secure binding process S617 is started using a system firmware key 664 contained in a certificate, which may be either private or public. In an embodiment, the secure hash 666 may include the OSid2 662. In other embodiments, the secure hash 666 may include the OSid2 662 and (a) an identity of the logical partition (VM) 658 or (b) cryptographic configuration data 660, or both (a) and (b). In another embodiment, the secure hash 666 may be generated by further using the OSid1 562. The secure hash 666 is loaded by the second level operating system OSL2 into the secure storage device 103 (e.g. in a subdomain assigned to OSL2) in step S618. This is followed by a verifying process (or authentication process) in the secure storage device 103 in step S620. Then the secure storage device 103 is set to online in a secure mode in step S622 for accesses by or involving the second level operating system OSL2. A second trusted key entry flag TF2 is set to an on-state in step S624, resulting in setting a crypto card (SSD 103) action to default action. If the trusted key entry flag TF2 is in an on-state, no changes via the second level operating system OSL2 to the system are allowed, if the trusted key entry flag TF is in an off-state, changes via the OSL2 to the system are allowed. The customer, e.g. an owner of the OSL1 and associated data in the secure storage device, thus may authorize the provider via the trusted key entry flag TF2 to perform changes to the system. Authorization is enabled via the TKE system 105. In another embodiment, the same flag TF1 or TF2 may be used for enabling access via the OSL1 and via the OSL2.

Having accomplished the secure binding process S617, access to the second level operating system OSL2 233 is possible, step S614. By action of a customer via the TKE system 105, transmitted possibly over TCP/IP via the second level operating system OSL2 130, a personalization and a setup of secret data stored in subdomains assigned to second level OSL2, 233 in the secure storage device 103 can be performed.

Figure 6:
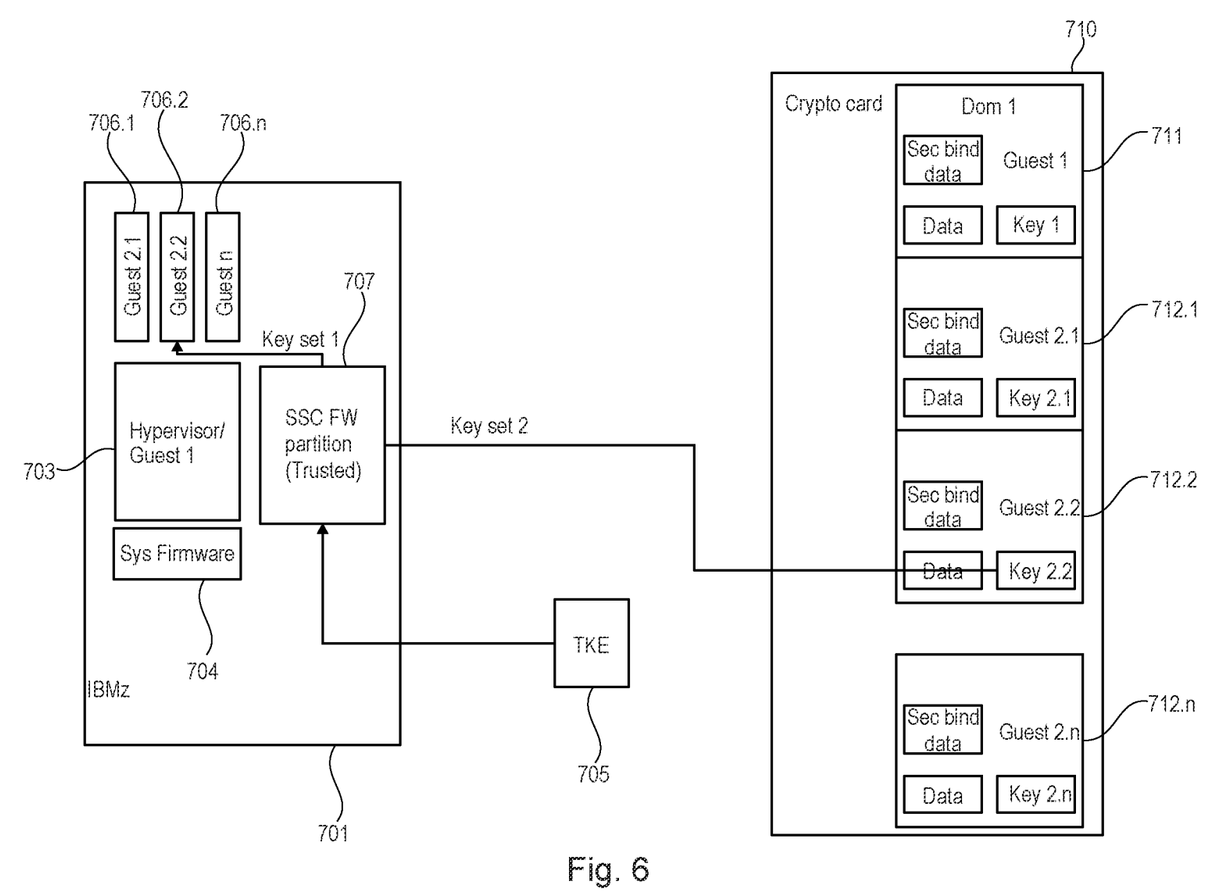
FIG. 6 is a diagram illustrating a method for initializing a secure channel between a secure storage device and a second level OS in accordance with an embodiment of the invention.

FIG. 6 is a diagram illustrating a method for initializing a secure channel between the secure storage device 103 (or crypto card) and a second level OS, according to various embodiments. For example, the secure channel may be used second level OSL2, 233 for accessing data in subdomains that are assigned to the OSL2, 233. The secure channel may employ public-key encryption.

FIG. 6 provides an example of the system of FIG. 1, where the computer system 101 may be an IBM/z system 701. In the system 701, a first level hypervisor 703, referred to as guest 1 hypervisor, may be part of system firmware 704. The system 701 further comprises second level operating systems 706.1-$n$ denoted as guest 2.x in the figure.

The system 701 is provided with a partition 707 for providing a secure firmware appliance in the partition. The partition 707 may be logical or physical partition. The partition 707 may, for example, be an IBM trusted secure service container (SSC) FW partition. In an embodiment, a secure service container partition contains its own embedded operating system and security mechanism.

FIG. 6 further depicts an example of the secure storage device 103 being a crypto card 710. The crypto card 710 is shown as comprising a domain 711 that includes subdomains 712.1-$n$, each assigned to one of the respective second level (Guest) OS 706.1-$n$. Each of the domain 711 and subdomains 712.1-$n$ store a portion of secret data (named 'Sec bind data') that can be used for authentication in accordance with the present disclosure and other portions of secret data (referred to as 'Data" and 'key x' in the figure).

The TKE system 705 is configured to generate a first set of keys that may be received the TKE system at the second level OS 706.1-$n$ via the partition 707. The TKE system further generates a corresponding second set of keys that is stored in the crypto card 710. The first set of keys may include a private key of a first pair of keys and a public key of a second pair of keys. The second set of keys may include a public key of the first pair of keys and a private key of the second pair of keys.

For example, as illustrated in FIG. 6, TKE system 705 may generate 2 PK key pairs (PK1 & PK2) which could also be done through the secure service container (SSC) FW partition itself. The private key of PK1 (for key 2.2) may be written to Guest (G2.2) 706.2.2 and the public key of PK1 may be written to subdomain of G2.2 712.2 in Crypto card (key 2.2). The public key of PK2 may be written to Guest (G2.2) 706.2 and the private key of PK2 may be written to subdomain of G2.2 712.2 in crypto card 710. In another example, a symmetric Key may be used for secure data communication between the second level OS 706.1-$n$ and the respective subdomains 712.1-$n$. The key pairs PK1 and PK2 may be used for the pair second level OS 706.2 and subdomain 712.2 only, or may be used for other pairs of such as second level OS 706.1 and subdomain 712.1.

A secure channel may be established between the second level OS 706.2 and the respective subdomain 712.2 in the crypto card 710 by exchanging the first and second set of keys, and employing public-key encryption. The communication between the second level OS 706.2 and the respective subdomain 712.2 in the crypto card 710 is performed through the partition 707.

In another embodiment, a computer system is provided with at least one first level hypervisor managing at least one first level virtual machine instance and at least one second level hypervisor executed in a first level virtual machine instance, the second level hypervisors managing at least one second level virtual machine instance, the computer system further comprising a crypto card comprising a persistent storage to store secret data, the crypto card supporting at least public-key cryptography. The computer system is characterized by the crypto card managing and storing a domain for each first level virtual machine instance in its persistent storage, wherein the domain comprises a first area for secure data in encrypted form for the respective first level virtual machine instance, and additional areas for each second level virtual instance managed by the respective second level hypervisor, each additional area comprising secure data of the respective second level virtual machine instance in encrypted form using public-key cryptography, wherein for each area a separate public encryption key is used; for each hypervisor and virtual machine instance which store secret data in the crypto card, an encrypted communication channel to the crypto card using public-key encryption; a trusted key entry facility for managing the encryption key pairs used to encrypt and decrypt data by the crypto card, hypervisors, and virtual machine instances.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for operating a secure storage device, comprising:
   configuring a computer system with at least one first level hypervisor managing at least one first level virtual machine (VM), the first level VM supporting a first level operating system (OS);
   configuring the first level virtual machine (VM) of the computer system with at least one second level hypervisor, the second level hypervisor managing at least one second level VM, the second level VM supporting a second level OS;
   storing first data indicative of the first level OS in a domain of the secure storage device, wherein the first data is not accessible by the second level OS;
   storing second data indicative of the second level OS in a subdomain of the domain of the secure storage device, wherein the second data is not accessible by the first level OS;
   storing in the computer system first profile data indicative of the first level OS and the domain of the secure storage device;
   storing in the computer system second profile data indicative of the second level OS and the subdomain of the secure storage device;
   sending the first profile data from the computer system to the secure storage device and performing, by the secure storage device, a first authentication process to authenticate the first level OS using the first profile data and a portion of the first data;
   sending the second profile data from the computer system to the secure storage device and performing, by the secure storage device, a second authentication process to authenticate the second level OS using the second profile data and a portion of the second data;
   in response to receiving a request from a trusted key entry system by the first level OS to manage the second data, forwarding the received request to the secure storage device by the first level OS, thereby causing the secure storage device to process the request; and
   in response to receiving by the first or second OS a request to manage the other portion of the first or second data respectively from a trusted key entry system, forwarding by the first OS or the second OS the received request to the secure storage device thereby causing the secure storage device to process the request.

2. The method of claim 1, further comprising:
   associating the portion of the first data with a first flag;
   associating the portion of the second data with a second flag;
   setting the first flag and second flag for enabling a change of the portions of the first and second data respectively.

3. The method of claim 2, wherein setting the first or second flag comprises:
   receiving a request from the trusted key entry system for setting the first or second flag respectively; and
   forwarding the request to the secure storage device, thereby causing the secure storage device to set the first or second flag.

4. The method of claim 2, wherein the first and second flags are a same flag.

5. The method of claim 1, wherein:
   the portion of the first data includes a first hash,
   the portion of the second data includes a second hash,
   the first profile data includes a hash that is generated from a unique identification of the first OS and a configuration data indicative of the domain, and
   the second profile data includes a hash that is generated from a unique identification of the second OS and a configuration data indicative of the subdomain; and
   wherein the first authentication process further comprises comparing the hash included in the first profile data with the first hash, and
   the second authentication process further comprises comparing the hash included in the second profile data with the second hash.

6. The method of claim 1, wherein the second OS is configured to receive requests from the trusted key entry system via the first OS and to communicate with the secure storage device via the first OS.

7. The method of claim 1, further comprising:
   creating a partition in the computer system, the partition including a secure firmware appliance,
   wherein the performing a second authentication process to authenticate the second level OS includes connecting the trusted key entry system to the partition, connecting the second level OS to the partition, and configuring the second level OS to receive data from the trusted key entry system via the partition and to send data to the secure storage device via the partition.

8. The method of claim 7 wherein the second profile data are sent via the firmware appliance.

9. The method of claim 7, further comprising:
   transmitting a first set of keys from the TKE system to the second level OS,
   transmitting a second set of keys from the TKE system to the secure storage device, and
   establishing a secure channel between the second level OS and the secure storage device by exchanging the first and second set of keys.

10. The method of claim 9, the first set of keys include a private key of a first pair of keys and a public key of a second pair of keys, and the second set of keys include a public key of the first pair of keys and a private key of the second pair of keys.

11. The method of claim 1, wherein the sending of the second profile data is performed in response to a successful authentication of the first level OS.

12. A computer program product comprising a non-transitory computer-readable storage medium having computer-readable program instructions stored thereon, the instructions being for a hardware processor to perform a process for operating a secure storage device, comprising:
   instructions for configuring a computer system with at least one first level hypervisor managing at least one first level virtual machine (VM), the first level VM supporting a first level operating system (OS);
   instructions for configuring the first level virtual machine (VM) of the computer system with at least one second level hypervisor, the second level hypervisor managing at least one second level VM, the second level VM supporting a second level OS;
   instructions for storing first data indicative of the first level OS in a domain of the secure storage device, wherein the first data is not accessible by the second level OS;
   instructions for storing second data indicative of the second level OS in a subdomain of the domain of the secure storage device, wherein the second data is not accessible by the first level OS;
   instructions for storing in the computer system first profile data indicative of the first level OS and the domain of the secure storage device;
   instructions for storing in the computer system second profile data indicative of the second level OS and the subdomain of the secure storage device;
   instructions for sending the first profile data from the computer system to the secure storage device and performing, by the secure storage device, a first authentication process to authenticate the first level OS using the first profile data and a portion of the first data;
   instructions for sending the second profile data from the computer system to the secure storage device and performing, by the secure storage device, a second authentication process to authenticate the second level OS using the second profile data and a portion of the second data;
   instructions for, responsive to receiving a request from a trusted key entry system by the first level OS to manage the second data, forwarding the received request to the secure storage device by the first level OS, thereby causing the secure storage device to process the request; and
   instructions for, responsive to receiving by the first or second OS a request to manage the other portion of the first or second data respectively from a trusted key entry system, forwarding by the first OS or the second OS the received request to the secure storage device thereby causing the secure storage device to process the request.

13. A system comprising:
   a computer system having at least one first level hypervisor managing at least one first level virtual machine (VM), the first level VM supporting a first level operating system (OS), wherein the first level virtual machine (VM) of the computer system includes at least one second level hypervisor, the second level hypervisor managing at least one second level VM, the second level VM supporting a second level OS;
   a secure storage device having first data indicative of the first level OS stored in a domain of the secure storage device, wherein the first data is not accessible by the second level OS;
   the storage device having second data indicative of the second level OS stored in a subdomain of the domain of the secure storage device, wherein the second data is not accessible by the first level OS;
   the computer system having stored therein first profile data indicative of the first level OS and the domain of the secure storage device;
   the computer system having stored therein second profile data indicative of the second level OS and the subdomain of the secure storage device;
   wherein the computer system and the secure storage device each include a memory storing computer-readable program instructions, the instructions being for a process for operating the secure storage device, the instructions including:
   instructions for sending the first profile data from the computer system to the secure storage device and performing, by the secure storage device, a first authentication process to authenticate the first level OS using the first profile data and a portion of the first data;
   instructions for sending the second profile data from the computer system to the secure storage device and performing, by the secure storage device, a second authentication process to authenticate the second level OS using the second profile data and a portion of the second data;
   instructions for, responsive to receiving a request from a trusted key entry system by the first level OS to manage the second data, forwarding the received request to the secure storage device by the first level OS, thereby causing the secure storage device to process the request; and
   instructions for, responsive to receiving by the first or second OS a request to manage the other portion of the first or second data respectively from a trusted key entry system, forwarding by the first OS or the second OS the received request to the secure storage device thereby causing the secure storage device to process the request.

14. The system of claim 13, further comprising instructions for:
   associating the portion of the first data with a first flag;
   associating the portion of the second data with a second flag;
   setting the first flag and second flag for enabling a change of the portions of the first and second data respectively.

15. The system of claim 13, wherein the instructions for setting the first or second flag comprise:
   instructions for receiving a request from the trusted key entry system for setting the first or second flag respectively; and
   instructions for forwarding the request to the secure storage device, thereby causing the secure storage device to set the first or second flag.

16. The system of claim 13, wherein the first and second flags are a same flag.

17. The system of claim 13, wherein:
   the portion of the first data includes a first hash,
   the portion of the second data includes a second hash,
   the first profile data includes a hash that is generated from a unique identification of the first OS and a configuration data indicative of the domain, and the second profile data includes a hash that is generated from a unique identification of the second OS and a configuration data indicative of the subdomain; and wherein the first authentication process further comprises comparing the hash included in the first profile data with the first hash, and the second authentication process further comprises comparing the hash included in the second profile data with the second hash.

18. The system of claim 13, wherein the second OS is configured to receive requests from the trusted key entry system via the first OS and to communicate with the secure storage device via the first OS.

19. The system of claim 13, wherein:

the computer system includes a partition, the partition including a secure firmware appliance, wherein the performing a second authentication process to authenticate the second level OS includes connecting the trusted key entry system to the partition, connecting the second level OS to the partition, and configuring the second level OS to receive data from the trusted key entry system via the partition and to send data to the secure storage device via the partition.

20. The system of claim 19, further comprising instructions for:

transmitting a first set of keys from the TKE system to the second level OS, transmitting a second set of keys from the TKE system to the secure storage device, and establishing a secure channel between the second level OS and the secure storage device by exchanging the first and second set of keys.

* * * * *